US010097260B2

United States Patent
Hosseini et al.

(10) Patent No.: US 10,097,260 B2
(45) Date of Patent: Oct. 9, 2018

(54) CURRENT INDICATION CHANNEL FOR EMBB/URLLC MULTIPLEXING

(71) Applicant: QUALCOMM Incorporated, San Diego, CA (US)

(72) Inventors: Seyedkianoush Hosseini, San Diego, CA (US); Alexandros Manolakos, San Diego, CA (US); Chong Li, Weehawken, NJ (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,858

(22) Filed: Sep. 19, 2017

(65) Prior Publication Data

US 2018/0227047 A1 Aug. 9, 2018

Related U.S. Application Data

(60) Provisional application No. 62/455,272, filed on Feb. 6, 2017.

(51) Int. Cl.

| H04B 7/26 | (2006.01) |
|---|---|
| H04W 16/02 | (2009.01) |
| H04L 5/00 | (2006.01) |
| H04L 5/14 | (2006.01) |

(Continued)

(52) U.S. Cl.
CPC ............... *H04B 7/26* (2013.01); *H04L 5/001* (2013.01); *H04L 5/1469* (2013.01); *H04W 16/02* (2013.01); *H04W 72/0453* (2013.01); *H04W 88/08* (2013.01)

(58) Field of Classification Search
CPC ......... H04B 7/26; H04L 5/001; H04L 5/1469; H04W 16/02; H04W 72/0453
See application file for complete search history.

(56) References Cited

U.S. PATENT DOCUMENTS

| 2017/0079059 A1 | 3/2017 | Li et al. |
|---|---|---|
| 2017/0111886 A1 | 4/2017 | Kim et al. |

(Continued)

FOREIGN PATENT DOCUMENTS

| CN | 106506123 A | 3/2017 |
|---|---|---|
| WO | WO-2017/014558 A1 | 1/2017 |

OTHER PUBLICATIONS

International Search Report and Written Opinion—PCT/US2018/013319—ISA/EPO—dated Mar. 28, 2018. 14 pages.

(Continued)

*Primary Examiner* — Chi H Pham
*Assistant Examiner* — Weibin Huang
(74) *Attorney, Agent, or Firm* — Arent Fox, LLP

(57) ABSTRACT

Aspects of the present disclosure describe an indication channel for wireless communications that indicates whether an ultra-reliable low-latency communication (URLLC) transmission is present in a current mini-slot within an enhanced mobile broadband (eMBB) slot. A base station may determine that an indication message is to be transmitted within the eMBB slot. The indication message may indicate that at least a portion of the mini-slot of the eMBB slot is used for the URLLC transmission. The base station may allocate one or more resources to an indication channel in a same mini-slot as the portion of the mini-slot to be used for the URLLC transmission. The base station may transmit the indication message during the mini-slot on the indication channel using the allocated one or more resources. A UE may receive the indication channel and process at least the portion of the mini-slot based on whether the indication message is received.

27 Claims, 7 Drawing Sheets

(51) Int. Cl.
*H04W 72/04* (2009.01)
*H04W 88/08* (2009.01)

(56) References Cited

U.S. PATENT DOCUMENTS

| | | | |
|---|---|---|---|
| 2017/0135102 A1 | 5/2017 | Ma et al. | |
| 2017/0142591 A1* | 5/2017 | Vrzic | H04W 24/08 |
| 2017/0285130 A1* | 10/2017 | Kim | H04L 1/00 |
| 2017/0310431 A1* | 10/2017 | Iyer | H04L 1/1861 |
| 2017/0332359 A1* | 11/2017 | Tsai | H04B 7/0617 |
| 2017/0338987 A1* | 11/2017 | Zhou | H04L 27/2602 |

OTHER PUBLICATIONS

Qualcomm Incorporated: "URLLC/eMBB Downlink Dynamic Multiplexing Schemes", 3GPP Draft ; R1-1700827, 3rd Generation Partnership Project (3GPP), Mobile Competence Centre ; 650, Route Des Lucioles ; F-06921 Sophia-Antipolis Cedex ; France, vol. RAN WG 1 , no. Spokane, Wa; Jan. 16, 2017-Jan. 20, 2017 Jan. 16, 2017 (Jan. 16, 2017), XP051208346, Retrieved from the Internet: URL:http://www.3gpp.org/ftp/Meetings_3GPP_SYNC/RAN1/Docs/ [retrieved on Jan. 16, 2017]. 7 pages.

Sequans Communications: "On Dynamic Resource Sharing Between URLLC and eMBB in DL", 3GPP Draft ; R1-1700642—On Dynamic DL Resource Sharing Between URLLC and EMBB, 3rd Generation Partnership Project (3GPP), Mobile Competence Centre ; 650, Route Des Lucioles ; F-06921 Sophia-Antipolis, vol. RAN WG 1, no. Spokane, USA; Jan. 16, 2017-Jan. 20, 2017 Jan. 16, 2017 (Jan. 16, 2017), XP051208167, Retrieved from the Internet: URL:Dhttp://www.3gpp.org/ftp/Meetings_3GPP_SYNC/RAN1/Docs/ [retrieved on Jan. 16, 2017]. 6 pages.

\* cited by examiner

CURRENT INDICATION CHANNEL FOR EMBB/URLLC MULTIPLEXING

This application claims priority to U.S. Provisional Application No. 62/455,272, titled "CURRENT INDICATION CHANNEL FOR EMBB/URLLC MULTIPLEXING," filed Feb. 6, 2017, which is assigned to the assignee hereof, and incorporated herein by reference in its entirety.

BACKGROUND

Aspects of the present disclosure relate generally to wireless communication systems, and more particularly, to multiplexing communications within a set of resources.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

A base station may provide both eMBB and URLLC services using the same resources. A user equipment (UE) configured to receive one of the eMBB or URLLC service may be unaware of whether one or more resources is used for eMBB or URLLC. Accordingly, it would be desirable to provide the UE with information regarding a current communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, the present disclosure provides a method of transmitting an indication channel for wireless communications. The method may include determining, by a base station, that an indication message is to be transmitted within an eMBB slot on the indication channel. The indication message may indicate that at least a portion of a mini-slot of the eMBB slot is to be used for an URLLC transmission. The method may include allocating one or more resources to the indication channel based on the determination, the allocated one or more resources being in a same mini-slot as at least the portion of the mini-slot to be used for the URLLC transmission. The method may include transmitting the indication message during the mini-slot on the indication channel using the allocated one or more resources.

According to another example, the present disclosure provides a method of receiving an indication channel for wireless communications. The method may include monitoring, by a UE, the indication channel during a mini-slot of an eMBB slot. The method may include determining whether an indication message is received over the indication channel, the indication message indicating at least a portion of the mini-slot is used for an URLLC transmission. The method may include processing at least the portion of the mini-slot based on whether the indication message is received.

In a further aspect, a base station for wireless communication is provided that includes a transceiver, a memory configured to store instructions, and one or more processors communicatively coupled with the transceiver and the memory. The one or more processors are configured to determine that an indication message is to be transmitted within an eMBB slot, the indication message indicating at least a portion of a mini-slot of the eMBB slot is used for an URLLC transmission. The one or more processors are configured to allocate one or more resources to an indication channel based on the determination, the allocated one or more resources being in a same mini-slot as at least the portion of the mini-slot to be used for the URLLC transmission. The one or more processors are configured to transmit the indication message during the mini-slot on the indication channel using the allocated one or more resources.

In another aspect, a UE for wireless communication is provided that includes a transceiver, a memory configured to store instructions, and one or more processors communicatively coupled with the transceiver and the memory. The one or more processors are configured to monitor an indication channel during a mini-slot of an eMBB slot. The one or more processors are configured to determine whether an indication message is received over the indication channel, the indication message indicating at least a portion of the mini-slot is used for an URLLC transmission. The one or more processors are configured to process at least the portion of the mini-slot based on whether the indication message is received.

In a further aspect, a base station for wireless communication is provided that includes a transceiver, a memory configured to store instructions, and one or more processors communicatively coupled with the transceiver and the memory. The base station includes means for determining that an indication message is to be transmitted within an eMBB slot, the indication message indicating at least a portion of a mini-slot of the eMBB slot is used for an URLLC transmission. The base station includes means for allocating one or more resources to an indication channel based on the determination, the allocated one or more resources being in a same mini-slot as at least the portion of the mini-slot to be used for the URLLC transmission. The base station includes means for transmitting the indication message during the mini-slot on the indication channel using the allocated one or more resources.

In another aspect, a UE for wireless communication is provided that includes a transceiver, a memory configured to store instructions, and one or more processors communicatively coupled with the transceiver and the memory. The UE includes means for monitoring an indication channel during a mini-slot of an eMBB slot. The UE includes means for determining whether an indication message is received over the indication channel, the indication message indicating at least a portion of the mini-slot is used for an URLLC transmission. The UE includes means for processing at least the portion of the mini-slot based on whether the indication message is received.

In yet another aspect, a computer-readable medium is provided including code executable by one or more processors at a base station. The computer-readable medium includes code to determine that an indication message is to be transmitted within an eMBB slot, the indication message indicating at least a portion of a mini-slot of the eMBB slot is used for an URLLC transmission. The computer-readable medium includes code to allocate one or more resources to an indication channel based on the determination, the allocated one or more resources being in a same mini-slot as at least the portion of the mini-slot to be used for the URLLC transmission. The computer-readable medium includes code to transmit the indication message during the mini-slot on the indication channel using the allocated one or more resources.

In another aspect, a computer-readable medium is provided including code executable by one or more processors at a UE. The computer-readable medium includes code to monitor an indication channel during a mini-slot of an eMBB slot. The computer-readable medium includes code to determine whether an indication message is received over the indication channel, the indication message indicating at least a portion of the mini-slot is used for an URLLC transmission. The computer-readable medium includes code to process at least the portion of the mini-slot based on whether the indication message is received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
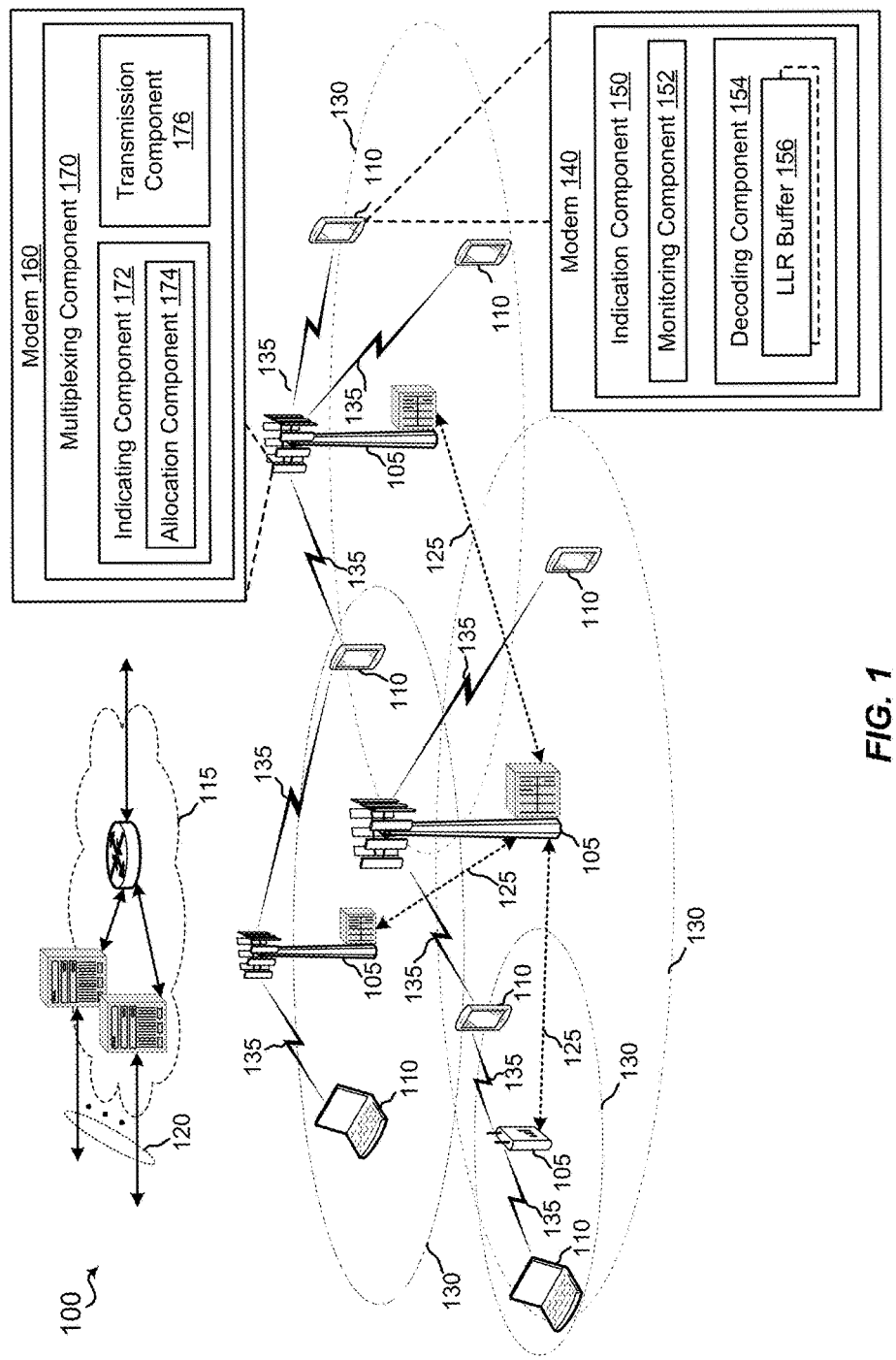
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to a current mini-slot indication channel for multiplexing between eMBB and URLLC communications that provides an indication of whether an URLLC transmission is present in a current mini-slot. The current mini-slot indication channel may be referred to as a "current indication channel," "thin indication channel," "current mini-slot indication channel," or simply "indication channel." Generally, eMBB communications may operate on a frame structure including slots. Each slot may include a plurality of symbols (e.g., OFDM symbols) defined by an eMBB numerology. URLLC communications may operate on a different frame structure than eMBB communications and use a shorter transmission time interval, which may be referred to as a mini-slot. In an aspect, the duration of a mini-slot may be the symbol period of the eMBB numerology. For example, the URLLC communications may use a second numerology that defines symbols having a shorter period than symbols of the eMBB numerology. Accordingly, the eMBB slot may include multiple mini-slots. In an aspect, the URLLC numerology may be scaled with respect to the eMBB numerology. For example, the symbol period of the eMBB numerology may be a multiple of the symbol period of the URLLC numerology. Accordingly, a number of URLLC symbols may be transmitted during the eMBB symbol period.

Due to the shorter duration and bursty nature of URLLC traffic, the base station may schedule URLLC traffic within an ongoing eMBB slot. Further, the base station may allocate time and frequency resources to either eMBB transmissions or URLLC transmissions When the URLLC traffic needs to be transmitted during the ongoing eMBB slot, some resources already assigned to the eMBB traffic may need to be given up in order to accommodate the URLLC transmission. In particular, a base station may puncture eMBB transmissions in order to transmit an URLLC transmission within a latency limit. As used herein, the term "puncture" may refer to transmitting the URLLC transmission on one or more resources instead of transmitting a previously scheduled eMBB transmission on the one or more resources.

In an aspect, the present disclosure provides an indication channel that may carry a message that indicates to a UE whether resources within the current mini-slot have been punctured by an URLLC transmission. Accordingly, a UE configured to receive an eMBB transmission (i.e., an eMBB UE) may disregard the punctured resources to improve decoding. For example, the UE may set log likelihood ratios corresponding to the punctured resources to zero. A UE configured to receive URLLC transmissions (i.e., an URLLC UE) may use the current mini-slot indication message to determine whether an URLLC transmission should be decoded from a portion of the mini-slot. If no message is decoded or no URLLC transmission is indicated, the URLLC UE may save power by not decoding the portion of the mini-slot.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects of the present disclosure, an example wireless communication network 100 includes at least one UE 110 with a modem 140 having an indication component 150 that determines whether the UE 110 has received an indication message on an indication channel that a current mini-slot includes an URLLC transmission. The indication component 150 may include a monitoring component 152 for monitoring the indication channel during a mini-slot within an eMBB slot, a decoding component 154 for determining whether an indication message is received over the indication channel, and at least one log likelihood ratio (LLR) buffer 156 for processing at least a portion of the mini-slot based on whether the indication message is received. Further, wireless communication network 100 includes at least one base station 105 with a modem 160 having a multiplexing component 170 that transmits the indication message regarding whether the current mini-slot includes URLLC communications. The multiplexing component 170 may include an indicating component 172 for determining that an indication message is to be transmitted within an eMBB slot, an allocation component 174 for allocating one or more resources to the indication channel, and a transmission component 176 for transmitting the indication message during the mini-slot. Thus, according to the present disclosure, the base station 105 may multiplex URLLC transmissions onto eMBB resources and indicates to one or more UEs whether the current mini-slot includes the URLLC transmissions to assist the UEs with decoding.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in the wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
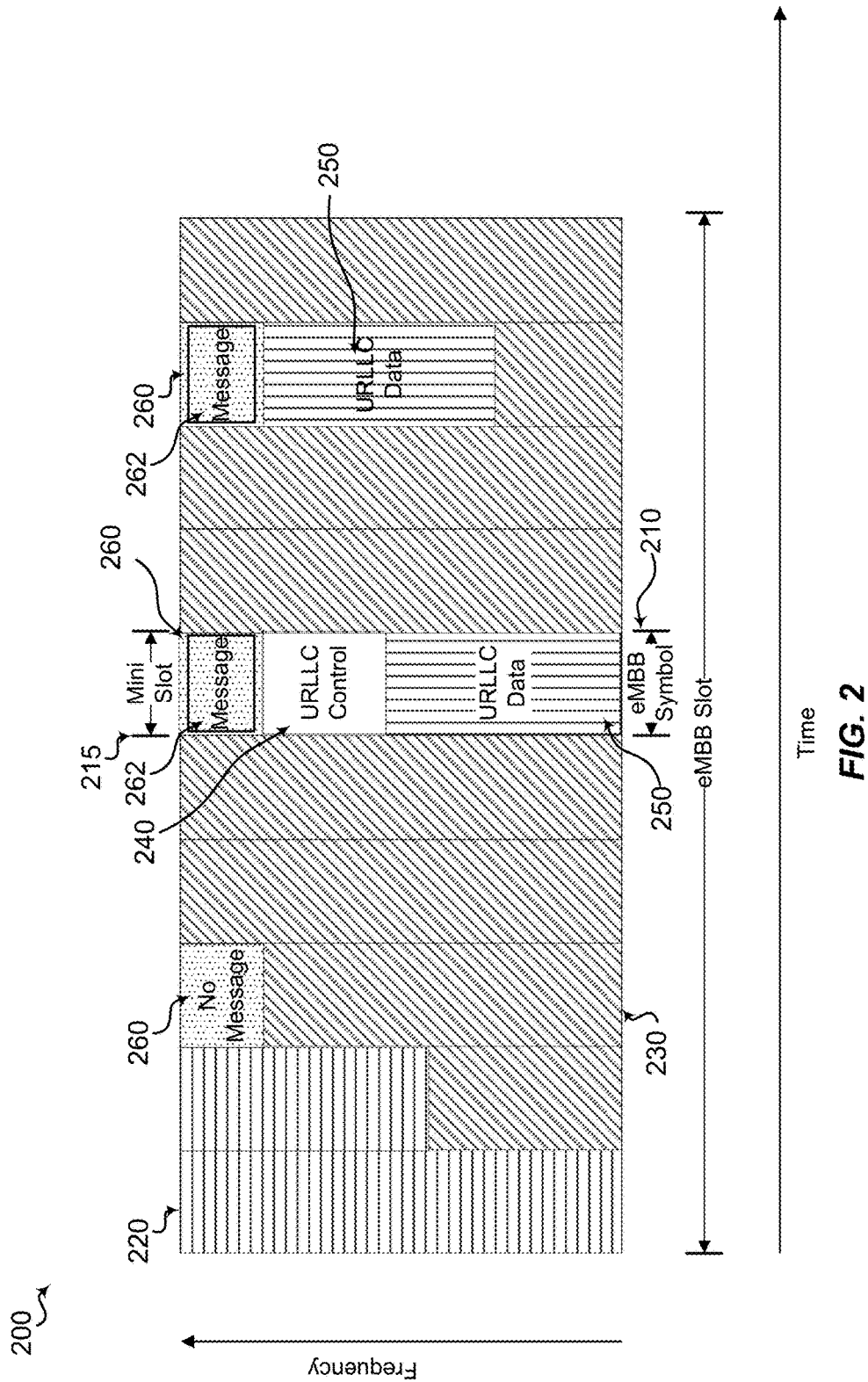
FIG. 2 is a conceptual diagram illustrating an exemplary transmission slot, in accordance with various aspects of the present disclosure.
Figure 3:
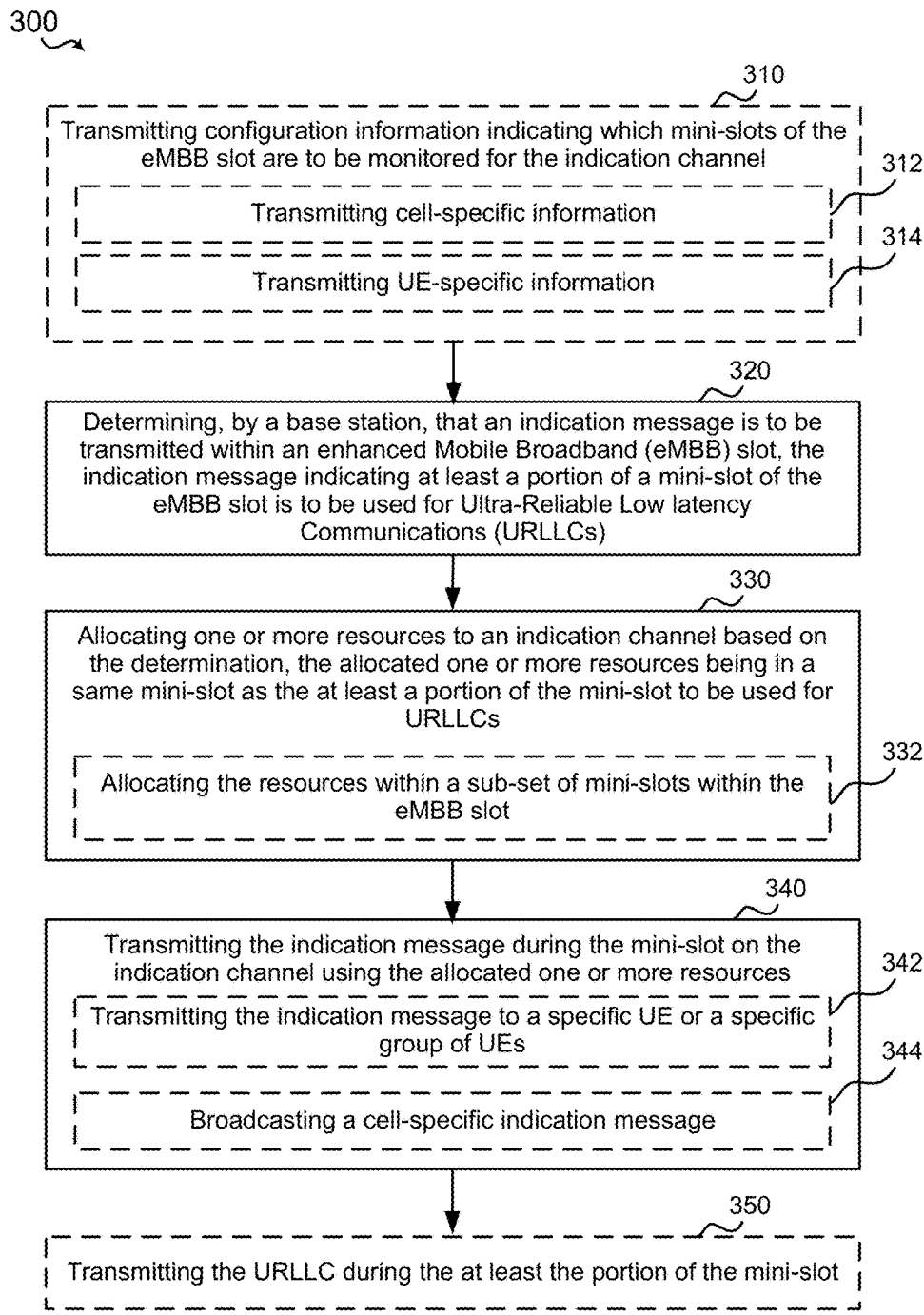
FIG. 3 is a flow chart illustrating an example of a method for transmitting an indication channel, in accordance with various aspects of the present disclosure.
Figure 4:
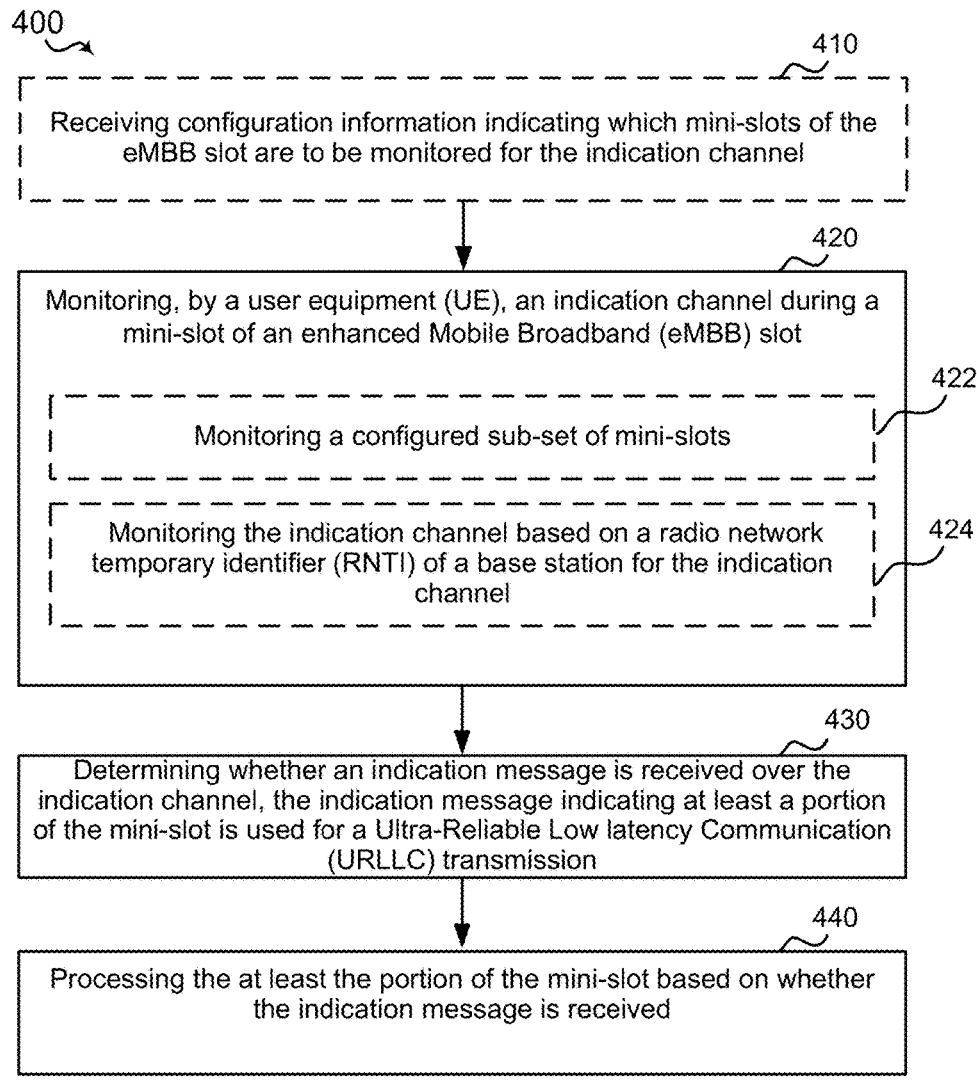
FIG. 4 is a flow chart illustrating an example of a method for receiving an indication channel, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 3 and 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 2 illustrates a resource diagram showing an example of an eMBB slot 200 multiplexed with URLLC transmissions. In the time domain, the eMBB slot 200 may include multiple eMBB symbol periods 210. For example, the illustrated eMBB slot 200 includes 10 eMBB symbol periods 210. In the frequency domain, the bandwidth may be divided into sub-carriers. An OFDM numerology may include a combination of a symbol period and sub-carrier spacing that produces orthogonal symbols. The combination of sub-carrier and symbol period may be referred to as a resource element (RE), which may be allocated by a base station 105. An eMBB transmission in the eMBB slot 200 may include an eMBB control channel 220 and an eMBB data channel 230.

In an aspect, the base station 105 may multiplex an URLLC transmission with the eMBB transmission by puncturing one or more symbols of the eMBB transmission. For example, the base station 105 may transmit an URLLC control channel 240 and URLLC data channel 250 instead of a scheduled symbol of the eMBB transmission. In an aspect, the URLLC transmission may be transmitted during a mini-slot 215 that may have a duration equal to the eMBB symbol period 210. Accordingly, the URLLC transmission may puncture certain REs. By puncturing a scheduled eMBB transmission, the base station may meet low latency requirements for the URLLC transmission, for example, because the URLLC transmission does not need to wait for the next eMBB slot. The puncturing of an eMBB transmission, however, may also affect a UE attempting to receive the eMBB transmission. In particular, if the UE is unaware that the eMBB transmission has been punctured, the UE may attempt to decode the eMBB transmission based on the URLLC transmission. Because the URLLC transmission carries different data using a different format, attempting to decode the URLLC transmission as an eMBB symbol may decrease the chances of correctly decoding the eMBB transmission when combined with other symbols. The UE may improve decoding performance of the eMBB transmission by ignoring the content of the URLLC transmission.

According to an aspect of the disclosure, the indication channel 260 may be provided to inform UEs of whether the current mini-slot includes an URLLC transmission. The indication channel 260 may be transmitted on a configured set of reserved resources within the eMBB slot 200. In an aspect, in terms of resource usage, sending the indication channel 260 over every mini-slot within an eMBB slot may incur significant overhead. The presence of the indication channel 260 within any mini-slot may be configurable. The configured resources may be indicated to the users either semi-statically (e.g., via RRC signaling) or dynamically (e.g. via an eMBB control channel such as PDCCH). The downlink eMBB and URLLC transmissions may be rate-matched around the configured resources reserved for the indication channel 260. For example, as illustrated in FIG. 2, the indication channel 260 is configured in the third, sixth, and ninth mini-slots 215 of the eMBB slot 200. An indication message 262 may be transmitted in the sixth and ninth mini-slots 215 to indicate the presence of an URLLC transmission. In mini-slots where the indication channel 260 is configured, but no URLLC transmission occurs, the frequency resources may be used for eMBB transmissions.

In the third mini-slot for example, the eMBB transmission may be rate-matched around the indication channel 260.

In an aspect, one purpose of enabling the indication channel 260 is for UEs configured for eMBB communication (also referred to as eMBB UEs) to infer which time/frequency resources assigned to them have been punctured by URLLC traffic. Accordingly, the indication channel 260 may be decodable at the eMBB UEs. For example, the indication channel 260 may follow the numerology of the eMBB service. The indication channel 260 may declare whether a portion of the current mini-slot is being used for an URLLC transmission by including an indication message 262. For example, the indication channel 260 in the third mini-slot may indicate that no URLLC transmission is present and the indication channel 260 in the sixth and ninth mini-slots may declare that URLLC transmissions are present using the indication messages 262. In an aspect, the base station 105 may not transmit an indication message 262 when no URLLC is present in the current mini-slot (e.g., in the third mini-slot).

In an aspect, decoding the current indication channel may also be useful for URLLC users. For example, the current indication channel may indicate to a UE configured for URLLC (also referred to as an URLLC UE) whether an URLLC transmission is present. The URLLC UE may decode the mini-slot only when the URLLC transmission is present. The URLLC UE may save power by avoiding unnecessary attempts to decode URLLC transmissions when such transmissions are not present. In particular, the URLLC UE may realize savings when decoding the indication channel 260 is easier than decoding the URLLC control channel 240. However, decoding the current indication channel may not be feasible for all URLLC users. For example, a UE may be unable to decode the current indication channel depending on the numerology used for the URLLC and eMBB transmissions. A UE may provide a UE capability indication regarding whether the UE 110 tries to decode the current indication channel when configured for URLLC communications.

The indication channel 260 may be transmitted in either a broadcast manner or a unicast manner. When transmitted in a broadcast manner, all eMBB users may be able to decode and benefit from the indication channel 260. Accordingly, the indication channel 260 may only indicate the presence of URLLC traffic within the current mini-slot. The indication channel 260 may be applicable at a per resource block (PRB) level, or per sub-band. URLLC users may also be able to decode a broadcast indication channel 260. When transmitted in a unicast manner, the current mini-slot indication channel may provide information for a specific UE or a group of UEs. Other UEs may be unable to use the indication channel 260. The intended users may decode the indication channel 260 and infer which time/frequency resources are punctured. Because the unicast current mini-slot indication channel is intended for a eMBB UE or group of eMBB UEs, URLLC users may not be able to decode the unicast indication channel 260.

The current indication channel may be dynamically configurable. The base station 105 may transmit the current indication channel only when needed. For example, the configuration of the current indication channel may be based on the current level of URLLC traffic. If there are no current URLLC users for the base station, the base station may reserve no resources for the indication channel 260. Instead, these resources can be used for downlink eMBB transmission. If there are URLLC users for the base station, the base station 105 may configure the current indication channel based on the needs of the URLLC service. The base station 105 may provide the indication channel 260 in one or more mini-slots of the eMBB slot 200. For example, as illustrated in FIG. 2, the indication channel 260 may be provided in the third, sixth, and ninth mini-slots.

In an aspect, either eMBB UEs or URLLC UEs may be unaware of whether any particular mini-slot includes the indication channel. The indication channel 260 may be pre-configured to use a static set of resources. Both the eMBB UEs and the URLLC UEs may monitor the pre-configured indication channel 260. For example, a UE 110 may attempt to decode the pre-configured resources of the indication channel 260. If an eMBB UE does not detect an indication message 262 on the indication channel 260, the eMBB UE may receive the signal over the mini-slot, and store the corresponding LLRs in the LLR buffer 156 for the purpose of decoding. In contrast, if an URLLC UE does not detect an indication message 262 on the indication channel 260, the URLLC UE may not receive the URLLC control/data channels over the mini-slot. On the other hand, if an eMBB UE does detect the indication message 262 on the indication channel 260, the eMBB UE may ignore LLR values corresponding to the mini-slot. For example, the UE 110 may set the stored LLR values to 0 or act as if the stored LLR values are 0. If an URLLC UE does detect the indication message 262 on the indication channel 260, the URLLC UE may receive the URLLC control/data channels over the mini-slot and store the LLR values in the LLR buffer 156 for decoding.

In another aspect, the base station 105 may provide the UE 110 with information regarding the indication channel configuration. The base station 105 may configure a subset of mini-slots within each eMBB slot for URLLC transmission. The base station 105 may limit the number of mini-slots that can potentially be used for URLLC transmission. The base station 105 may trade off some latency on the URLLC transmission (on the order of a few mini-slots), for the reduced overhead of the indication channel 260. Further, limiting the number of potential mini-slots may help both eMBB UEs and URLLC UES save power by not monitoring the indication channel 260 over the off (e.g., the first and second) mini-slots.

The base station 105 may provide the indication channel configuration in several ways. For example, the base station 105 may provide the indication channel configuration in a cell-specific manner by broadcasting the configuration to all users (e.g., using a system information block (SIB)). When the potential mini-slots of the indication channel configuration are indicated in a cell-specific manner, then both eMBB UEs and URLLC UEs may save power by only monitoring the indication channel over the configured mini-slots. As another example, the base station 105 may provide the indication channel configuration in a UE-specific manner either dynamically (e.g., via PDCCH) or semi-statically via higher layer signaling (e.g., RRC signaling). The UE-specific signaling may be more useful for the URLLC users. For example, each URLLC UE may monitor the indication channel only over a set of mini-slots configured for the particular URLLC UE. Accordingly, the URLLC UE may be able to micro-sleep between ON mini-slots for the URLLC UE. However, the configuration is less helpful for the eMBB UEs because the eMBB UEs may need to monitor the indication channel 260 over all potentially configured mini-slots, so the savings would be the same as a cell-specific indication.

In an aspect, an eMBB UE may not be required to monitor the indication channel 260. Instead, each eMBB UE may be configured to monitor the indication channel 260 based on UE capabilities and other configuration settings. For example, if the hybrid automatic repeat request (HARQ) timing for a UE 110 is sufficiently large (e.g., several slots), the eMBB UE may be able to wait for a post-indication channel before attempting to decode the mini-slot. As another example, if the configured timing advance for the eMBB UE is small, the UE 110 may have no need to monitor the indication channel and instead rely on the post-indication channel to acquire information related to URLLC puncturing. In some configurations, however, a hybrid indication scheme may be adopted where the eMBB UE may need to obtain information from the current indication channel and the post-indication channel to determine rate matching around punctured resources.

In an aspect, the indication channel 260 may be used to provide information regarding URLLC transmissions scheduled for neighbor cells instead of or in addition to information regarding URLLC transmissions scheduled for the serving cell. URLLC transmissions on the serving cell may puncture the eMBB communications, rendering the signals received in the mini-slot unusable for decoding. URLLC transmissions from neighboring cells may generate interference at the eMBB UE to the eMBB communication from the serving cell. The indication channel 260 may provide an indication of the estimated interference power from the neighbor cell, for example, time and frequency resources used by the neighboring cells to serve URLLC UEs. In particular, cell-edge users may be more prone to significant bursty interference from neighbor cell URLLC communications. The indication channel 260 may be used to provide UE-specific interference indications. Alternatively, cell-specific indications may be provided to inform all UEs of the level of interference, or to indicate that the UEs should not expect any useful data over the indicated min-slots (similar to puncturing).

In an aspect, the indication channel 260 conveying neighbor cell information may be obtained by a UE either from the serving base station or from the neighbor base station. The serving base station 105 may coordinate URLLC time/frequency resource assignments via backhaul communication. The base station 105 may then use the indication channel 260 to convey the resources used by neighboring cells to the eMBB UEs. The UE 110 may obtain the indication channel 260 directly from one or more neighbor cells by monitoring an indication channel search space. Each base station, or each cell, may be associated with a current indication radio network temporary identifier (CI-RNTI). The UE may obtain a set of CI-RNTI of neighbor base stations. The UE may then attempt to blindly decode not only the indication channel 260 of its own serving cell, but also the indication channel 260 of other cells using the set of CI-RNTI.

In an aspect, the indication channel 260 may also be used for eMBB/URLLC multiplexing in the uplink. By monitoring the indication channel 260 on the downlink, an eMBB UE may be informed that some resources that are already assigned to the eMBB UE in the uplink are going to be used by an URLLC UE in the uplink. For example, the indication channel may include an indication of assignment of resources in a future mini-slot, which may be within the eMBB slot 200. For example, the indication message 262 received in the sixth mini-slot may indicate that resources in the ninth mini-slot are to be used for uplink URLLC transmission. Accordingly, the eMBB UE may refrain from transmitting in the future mini-slot using the indicated resources.

Figure 7:
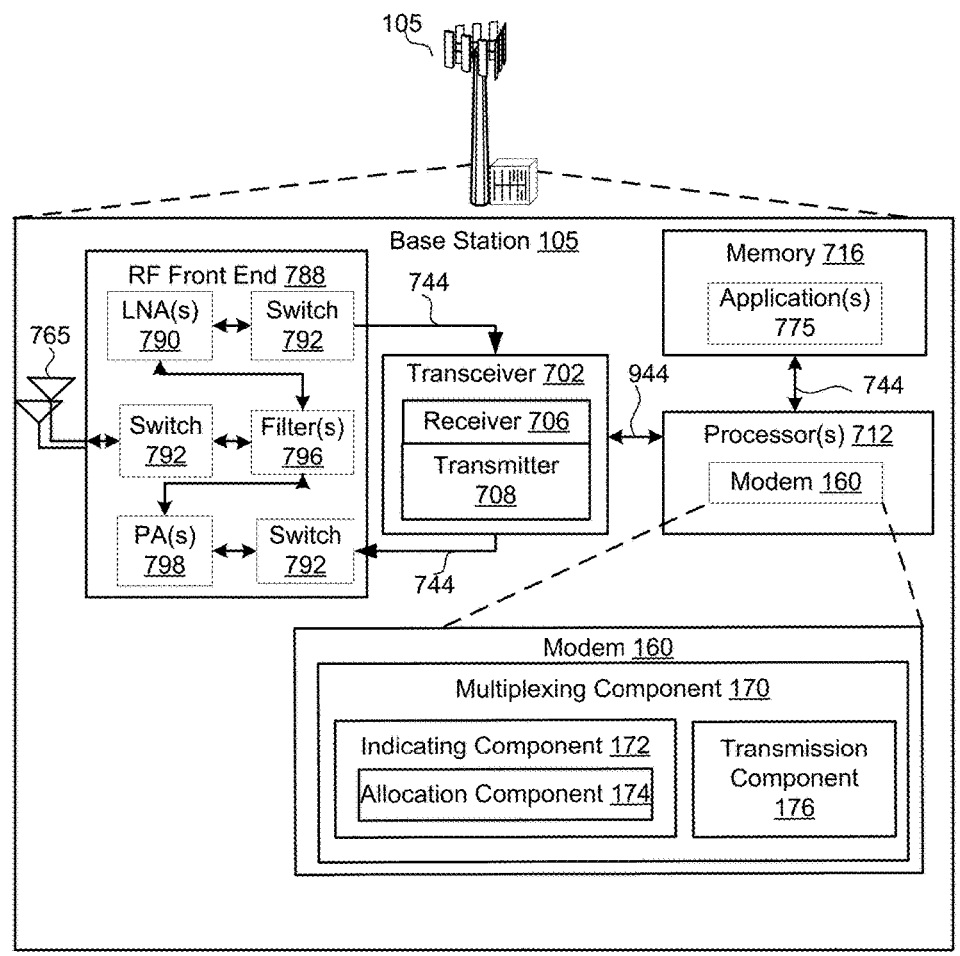
FIG. 7 is a schematic diagram of example components of the base station of FIG. 1.

Referring to FIG. 3, for example, a method 300 of wireless communication in operating base station 105 according to the above-described aspects to transmit an indication channel includes one or more of the herein-defined actions. The actions may be executed by a processor of the base station 105 such as the processors 712 (FIG. 7).

For example, at block 310, the method 300 optionally includes transmitting configuration information indicating which mini-slots of the eMBB slot are to be monitored for the indication channel. For instance, in an aspect, base station 105 may execute multiplexing component 170 to transmit configuration information indicating which mini-slots of the eMBB slot are to be monitored for the indication channel, as described herein. For example, the multiplexing component 170 may transmit the configuration information in an RRC configuration message or on an eMBB control channel. At block 312, transmitting the configuration information may optionally include transmitting cell-specific information applicable to any UE connected to the base station. For example, the multiplexing component 170 may transmit the cell-specific information. At block 314, transmitting the configuration information may optionally include transmitting UE-specific information applicable to a single UE or a specific group of UEs. For example, the multiplexing component 170 may transmit the UE-specific information.

At block 320, the method 300 may include determining, by a base station, that an indication message is to be transmitted within an eMBB slot, the indication message indicating at least a portion of a mini-slot of the eMBB slot is to be used for URLLCs. For instance, in an aspect, base station 105 may execute indicating component 172 to determine that an indication message 262 is to be transmitted within an eMBB slot. The indicating component 172 may determine that a portion of a mini-slot 215 of the eMBB slot is to be used for URLLCs. For example, the indicating component 172 may schedule the URLLCs in the mini-slot based on a latency requirement of the URLLCs. In another example, the indicating component 172 may determine that a neighbor cell is to transmit an URLLC in the mini-slot and that an indication message should be transmitted for the URLLC.

At block 330, the method 300 may include allocating one or more resources to an indication channel based on the determination, the allocated one or more resources being in a same mini-slot as the at least a portion of the mini-slot to be used for URLLCs. In an aspect, for example, the base station 105 may execute the allocation component 174 to allocate the one or more resources to the indication channel 260 based on the determination. The allocated one or more resources may be in the same mini-slot 215 as the at least a portion of the mini-slot to be used for URLLC transmissions. For example, a first portion of the mini-slot (e.g., resources in the frequency domain) may be used for the indication channel and a second portion of the mini-slot (e.g., the remaining resources in the frequency domain) may be used for the URLLCs. In block 332, the allocation component 174 may allocate the one or more resources within a configured sub-set of mini-slots within the eMBB slot to the indication channel. For example, as illustrated in FIG. 2, the configured sub-set of mini-slots may include the third, sixth, and ninth mini-slots 215 of the eMBB slot 200. The allocation component 174 may also allocate one or more resources to the URLLCs. The one or more resources allocated to the URLLCs may be resources that were previously allocated to an eMBB communication.

In block 340, the method 300 may include transmitting the indication message during the mini-slot on the indication channel using the allocated one or more resources. For instance, the base station 105 may execute the transmission component 176 to transmit the indication message during the mini-slot on the indication channel using the allocated one or more resources. In an aspect, the indication message may use the same numerology as an eMBB communication. Accordingly, a UE configured to receive and decode an eMBB communication may also receive and decode the indication channel. In block 342, transmitting the indication message may optionally include transmitting the indication message for a specific UE or a specific group of UEs. For example, the transmission component 176 may transmit the indication channel to UEs that are scheduled to receive an eMBB communication during the mini-slot. The transmission component 176 may scramble the indication channel using an identifier of the specific UE or the specific group of UEs. In block 344, transmitting the indication message may include broadcasting a cell-specific indication message to any UE served by the base station.

In block 350, the method 300 may optionally include transmitting the URLLCs during the at least the portion of the mini-slot. For instance, the base station 105 may execute the transmission component 186 to transmit the URLLCs during the at least the portion of the mini slot. The URLLCs may puncture a transmission for eMBB using at least the portion of the mini-slot of the eMBB slot. For example, instead of including the data for the initially scheduled symbol of the eMBB slot, the mini-slot may include the URLLC data. The eMBB slot may still be decoded based on other symbols within the eMBB slot.

Referring to FIG. 4, for example, a method 400 of wireless communication in operating UE 110 according to the above-described aspects to receive an indication channel includes one or more of the herein-defined actions.

For example, at block 410 the method 400 optionally includes receiving configuration information indicating which mini-slots of the eMBB slot are to be monitored for the indication channel. For instance, in an aspect, UE 110 may execute indication component 150 to receive the configuration information indicating which mini-slots of the eMBB slot are to be monitored for the indication channel, as described herein.

In block 420, the method 400 may include monitoring an indication channel during a mini-slot of an eMBB slot. For instance, in an aspect, UE 110 may execute monitoring component 152 to monitor the indication channel during a mini-slot of the eMBB slot. In block 422, monitoring the indication channel may optionally include monitoring the configured sub-set of mini-slots received in the configuration information in block 410. For example, the monitoring component 152 may monitor the configured sub-set of mini-slots received in the configuration information In another aspect, in block 424, monitoring the indication channel may optionally include monitoring the indication channel based on a RNTI of a base station. For example, the RNTI may include a C-RNTI of a serving base station or one or more CI-RNTIs of one or more neighbor base stations. The monitoring component 152 may monitor the indication channel based on the RNTI of the base station.

In block 430, the method 400 may include determining whether an indication message is received over the indication channel, the indication message indicating at least a portion of the mini-slot is used for an URLLC transmission. For instance, in an aspect, the UE 110 may execute decoding component 154 to determine whether the indication message is received over the indication channel. For example, the decoding component 154 may receive a signal on the resources indicated for the indication channel and attempt to decode the signal. If the decoding component 154 is unable to decode the signal, the decoding component 154 may determine that no indication message is received. If the decoding component 154 is able to decode the signal, the decoding component 154 may determine that the indication message is received and extract any content from the message. In an aspect, the decoding component may attempt to blind decode the signal using each of a set of CI-RNTIs associated with different neighbor cells. Accordingly, the decoding component 154 may receive an indication message from the serving cell or a neighbor cell.

In block 440, the method 400 may include processing the at least a portion of the mini-slot based on whether the indication message is received. For instance, the UE 110 may process LLRs stored in LLR buffer 156 based on whether the indication message is received. The processing may also be based on whether the UE is configured for eMBB communication or URLLC. Further details of the processing are described with respect to FIG. 5. For example, if the UE is configured for eMBB communication and no indication message is received, the processing may include storing the received signal in the LLR buffer 156 and attempting to decode the signal. As another example, if the UE is configured for eMBB communication and an indication message from the serving base station indicating that a set of time/frequency resources are punctured by URLLC, then the UE may not further process data over the indicated resources (e.g., the UE may perform no demodulation, no decoding, etc.). Instead, the UE may simply assume that the LLRs associated with these resources are zero. By avoiding further processing, the eMBB UE can save power. If the indication message from a neighbor cell is received, the processing may include addressing interference from the neighbor cell based on the indication. As another example, if the UE is configured for URLLC and no indication message is received, the processing may include determining not to decode an URLLC transmission based on the portion of the mini-slot if the UE is capable of decoding the indication channel. A UE that is unable to decode the indication message (e.g., because the indication message uses an eMBB numerology for which the UE is not configured) may still monitor and decode the URLLC control channel 240 and URLLC data channel 250. If the UE is configured for URLLC and an indication message is received, the processing may include decoding an URLLC transmission received in the portion of the mini-slot.

Figure 5:
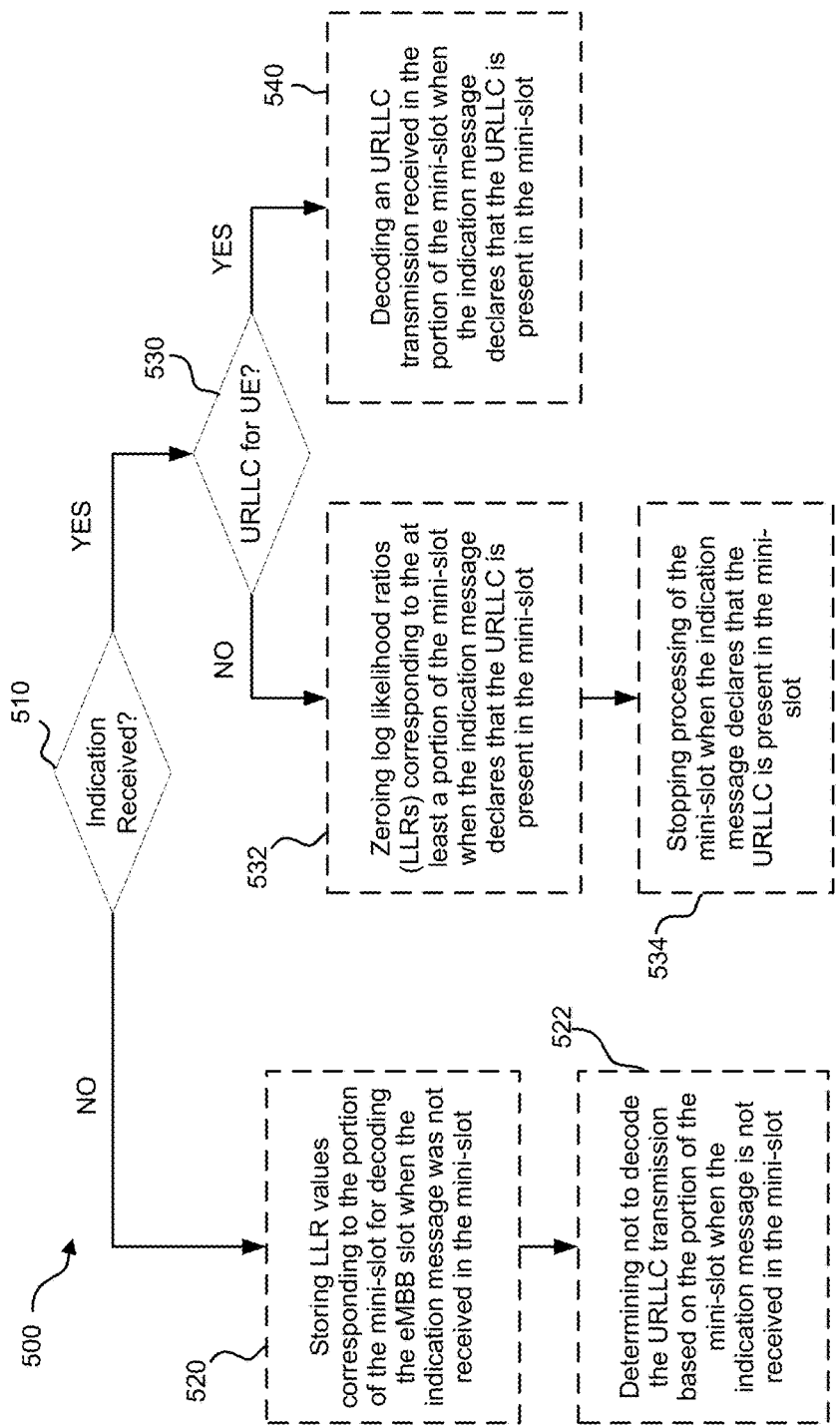
FIG. 5 is a flow chart illustrating an example of a method for processing a mini-slot, in accordance with various aspects of the present disclosure.

Referring to FIG. 5, a method 500 of operating UE 110 according to the above-described aspects to process at least a portion of a mini-slot based on an indication channel includes one or more of the herein-defined actions. In an aspect, the method 500 may correspond to the block 440 of method 400 (FIG. 4).

In block 510, the method 500 may include determining whether an indication message is received on the indication channel. In an aspect, for example, the indication component 150 may determine whether an indication message is received on the indication channel 260. If no indication message is received, the method 500 may proceed to block 520. If an indication message is received, the method 500 may proceed to block 530.

In block 520, the method 500 may include storing LLR values corresponding to the portion of the mini-slot for decoding the eMBB slot. For example, the LLR buffer 156 may store the LLR values corresponding to the portion of the mini-slot for decoding the eMBB slot. The decoding component 154 may decode the LLR values along with other LLR values received in other mini-slots. Because no URLLC communication is puncturing the eMBB transmission in the mini-slot, the LLR values may improve the decoding.

In block 522, the method 500 may include determining not to decode the URLLC transmission based on the portion of the mini-slot. For example, the decoding component 154 may determine not to decode the URLLC transmission based on the portion of the mini-slot. The data in the mini-slot may be eMBB data following an eMBB numerology. Accordingly, the decoding component 154 may avoid decoding the eMBB data as an URLLC transmission because such an attempt would be unsuccessful.

In block 530, the method 500 may include determining whether the mini-slot includes an URLLC transmission for the UE. In an aspect, for example, the monitoring component 152 may determine whether the mini-slot includes an URLLC for the UE 110 based on the indication channel 260 and/or the URLLC control channel 240. For instance, the monitoring component 152 may determine that the indication channel 260 or the URLLC control channel 240 includes an identifier of the UE 110. In contrast, if the UE 110 is not scheduled for URLLC, the monitoring component 152 may determine that the URLLC communication is not for the UE 110. Additionally, if the indication channel 260 indicates interference from another base station (e.g., the indication channel 260 is decoded with a CI-RNTI of a neighbor base station), the UE 110 may determine that the URLLC communication is not for the UE 110. If the URLLC is for the UE 110, the method 500 may proceed to block 540. If the URLLC is not for the UE 110, the method 500 may proceed to the block 532.

At block 532, the method 500 may include zeroing LLRs corresponding to the at least a portion of the mini-slot. In an aspect, for example, the decoding component 154 may zero LLRs stored in the LLR buffer 156 for the mini-slot. Because the stored LLRs correspond to an URLLC communication that is not for the UE, by zeroing the LLRS, the incorrect information will have less of an impact on decoding the eMBB slot.

At block 534, the method 500 may include stopping processing of the mini-slot when the indication message declares that the URLLC is present in the mini slot. For example, the decoding component 154 may stop processing of the mini-slot because the URLLC may puncture any eMBB symbols in the mini-slot. Accordingly, the decoding component 154 may save energy by stopping processing of the mini-slot.

At block 540, the method 500 may include decoding an URLLC transmission received in the portion of the mini-slot. In an aspect, for example, the decoding component 154 may decode the URLLC transmission received in the portion of the mini-slot. The decoding may include decoding the URLLC control channel 240 and decoding the URLLC data channel 250 based on the URLLC control channel 240. Additionally, in this case, both the eMBB transmission and the URLLC transmission may be for the same UE. The decoding component 154 may set LLRs associated with the portion of the mini-slot to zero when decoding the eMBB transmission.

Figure 6:
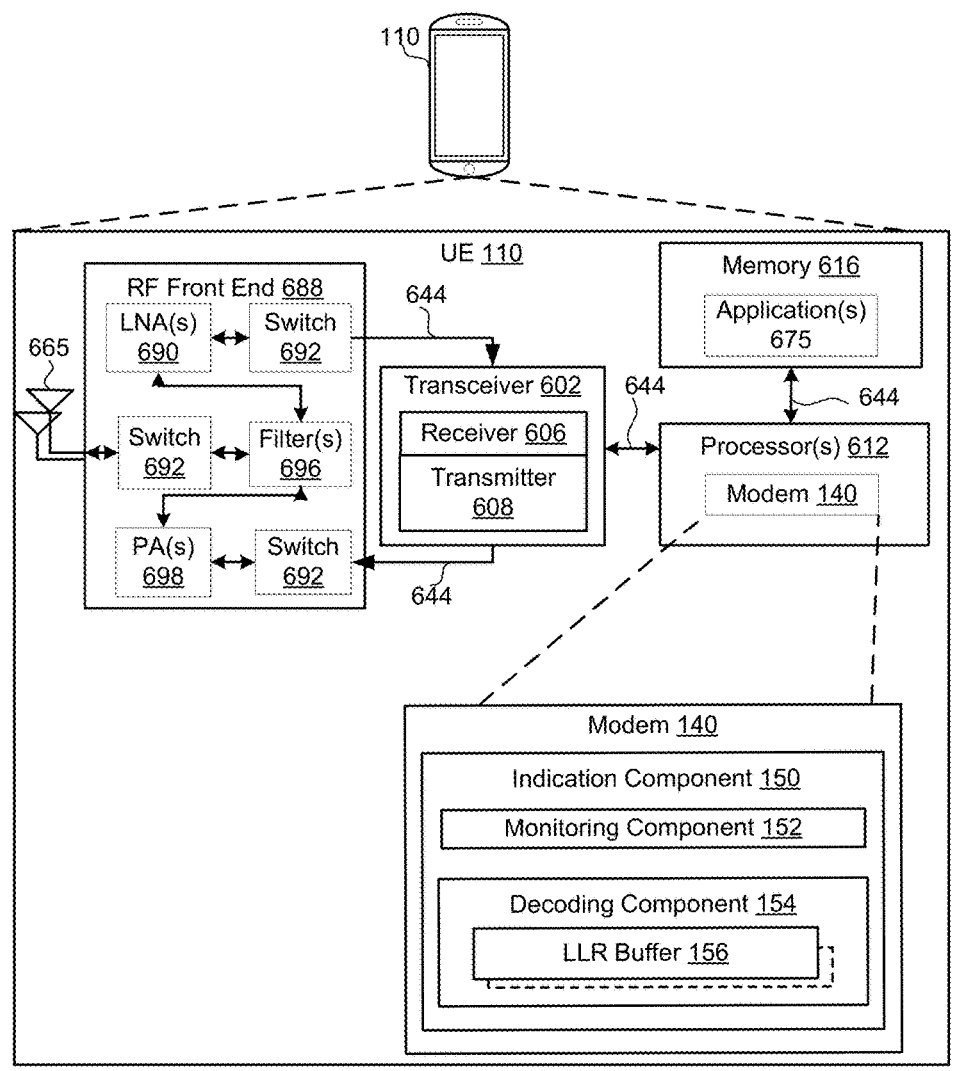
FIG. 6 is a schematic diagram of example components of the user equipment (UE) of FIG. 1.

Referring to FIG. 6, one example of an implementation of UE 110 may include a variety of components, some of which have already been described above, but including components such as one or more processors 612 and memory 616 and transceiver 602 in communication via one or more buses 644, which may operate in conjunction with modem 140 and indication component 150 to enable one or more of the functions described herein related to processing a mini-slot based on a received indication channel. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 140 that uses one or more modem processors. The various functions related to indication component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with indication component 150 may be performed by transceiver 602.

Also, memory 616 may be configured to store data used herein and/or local versions of applications 675 or indication component 150 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining indication component 150 and/or one or more of its subcomponents, and/or data associated therewith, when UE 110 is operating at least one processor 612 to execute indication component 150 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 602 to operate at a specified frequency and power level based on the UE configuration of the UE 110 and the communication protocol used by modem 140.

In an aspect, modem 140 can be a multiband-multimode modem, which can process digital data and communicate with transceiver 602 such that the digital data is sent and received using transceiver 602. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Referring to FIG. 7, one example of an implementation of base station 105 may include a variety of components, some of which have already been described above, but including components such as one or more processors 712 and memory 716 and transceiver 702 in communication via one or more buses 744, which may operate in conjunction with modem 160 and multiplexing component 170 to enable one or more of the functions described herein related to transmitting an indication channel that indicates whether a current mini-slot includes an URLLC transmission.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   determining, by a base station, that an indication message is to be transmitted within an enhanced Mobile Broadband (eMBB) slot, the indication message indicating at least a portion of a mini-slot of the eMBB slot previously assigned to one or more user equipments (UEs) for eMBB communication is to be punctured for an Ultra-Reliable Low latency Communication (URLLC) transmission;
   allocating one or more resources to an indication channel based on the determination, the allocated one or more resources being in a same mini-slot as the portion of the mini-slot to be used for the URLLC transmission; and
   transmitting the indication message to the one or more UEs during the mini-slot on the indication channel using the allocated one or more resources.

2. The method of claim 1, further comprising transmitting the URLLC transmission during at least the portion of the mini-slot.

3. The method of claim 2, wherein the URLLC transmission punctures a transmission for eMBB using at least the portion of the mini-slot of the eMBB slot.

4. The method of claim 1, wherein at least the portion of the mini-slot to be used for the URLLC transmission is to be transmitted by a neighbor cell, and wherein the indication message provides information to assist with addressing interference from the URLCC transmission from the neighbor cell.

5. The method of claim 1, further comprising transmitting configuration information indicating which mini-slots of the eMBB slot are to be monitored for the indication channel.

6. The method of claim 5, wherein the transmitting the configuration information comprises transmitting cell-specific information or UE-specific information.

7. The method of claim 1, wherein the allocating the one or more resources to the indication channel comprises allocating the one or more resources within a sub-set of mini-slots within the eMBB slot.

8. The method of claim 1, wherein the indication message uses a same numerology as the eMBB slot that is different than a numerology for the URLLC transmission.

9. The method of claim 1, wherein transmitting the indication message includes at least one of:
   transmitting the indication message to a specific UE or a specific group of UEs; or
   broadcasting a cell-specific indication message.

10. The method of claim 1, wherein the indication message indicates whether the URLLC transmission is present on a per resource block or per sub-band basis.

11. A method of wireless communications, comprising:
    monitoring, by a user equipment (UE), an indication channel during a mini-slot of an enhanced Mobile Broadband (eMBB) slot;
    determining whether an indication message is received over the indication channel, the indication message indicating at least a portion of the mini-slot is used for an Ultra-Reliable Low latency Communication (URLLC) transmission;
    determining, based on the indication message, whether at least the portion of the mini-slot was previously assigned to the UE for eMBB communication and is punctured by the URLLC transmission; and
    processing at least the portion of the mini-slot based on whether the portion of the mini-slot previously assigned to the UE for eMBB communication is punctured.

12. The method of claim 11, wherein the processing comprises zeroing log likelihood ratios (LLRs) corresponding to at least the portion of the mini-slot when the indication message declares that the URLLC transmission is present in the mini-slot.

13. The method of claim 11, wherein the processing comprises stopping processing of the mini-slot when the indication message declares that the URLLC transmission is present in the mini-slot.

14. The method of claim 11, wherein the processing comprises storing LLR values corresponding to at least the portion of the mini-slot for decoding the eMBB slot when the indication message was not received in the mini-slot.

15. The method of claim 11, wherein the monitoring comprises monitoring a configured sub-set of mini-slots.

16. The method of claim 11, wherein at least the portion of the mini-slot to be used for the URLLC transmission is to be transmitted by a neighbor cell, and wherein the indication message provides information to assist with addressing interference from the URLCC from the neighbor cell.

17. The method of claim 11, wherein the monitoring comprises monitoring the indication channel based on a radio network temporary identifier (RNTI) of a base station for the indication channel.

18. The method of claim 17, wherein the monitoring comprises blind decoding the indication channel for multiple RNTI associated with a set of neighbor cells.

19. The method of claim 11, wherein the indication message indicates that a future mini-slot is to be used for another URLLC transmission, the method further comprising: refraining from transmitting a previously scheduled transmission during the future mini-slot.

20. A base station for wireless communication, comprising:
   a transceiver;
   a memory configured to store instructions; and
   one or more processors communicatively coupled with the transceiver and the memory, wherein the one or more processors are configured to execute the instructions to:
   determine that an indication message is to be transmitted within an enhanced Mobile Broadband (eMBB) slot, the indication message indicating at least a portion of a mini-slot of the eMBB slot previously assigned to one or more user equipments (UEs) for eMBB communication is to be punctured for a Ultra-Reliable Low latency Communication (URLLC) transmission;
   allocate one or more resources to an indication channel based on the determination, the allocated one or more resources being in a same mini-slot as at least the portion of the mini-slot to be used for the URLLC transmission; and
   transmit the indication message to the one or more UEs during the mini-slot on the indication channel using the allocated one or more resources.

21. The base station of claim 20, wherein the transceiver is configured to transmit the URLLC transmission during the at least the portion of the mini-slot.

22. The base station of claim 21, wherein the URLLC transmission punctures a transmission for eMBB using at least the portion of the mini-slot of the eMBB slot.

23. The base station of claim 20, wherein the transceiver is configured to transmit configuration information indicating which mini-slots of the eMBB slot are to be monitored for the indication channel.

24. A user equipment (UE) for wireless communication, comprising:
   a transceiver;
   a memory configured to store instructions; and
   one or more processors communicatively coupled with the transceiver and the memory, wherein the one or more processors are configured to execute the instructions to:
   monitor an indication channel during a mini-slot of an enhanced Mobile Broadband (eMBB) slot;
   determine whether an indication message is received over the indication channel, the indication message indicating at least a portion of the mini-slot is used for an Ultra-Reliable Low latency Communication (URLLC) transmission;
   determine, based on the indication message, whether at least the portion of the mini-slot was previously assigned to the UE for eMBB communication and is punctured by the URLLC transmission; and
   process at least the portion of the mini-slot based on whether the portion of the mini-slot previously assigned to the UE for eMBB communication is punctured.

25. The UE of claim 24, wherein the one or more processors are configured to zero log likelihood ratios (LLRs) corresponding to at least the portion of the mini-slot when the indication message declares that the URLLC transmission is present in the mini-slot.

26. The UE of claim 24, wherein the one or more processors are configured to stop processing of the mini-slot when the indication message declares that the URLLC transmission is present in the mini-slot.

27. The UE of claim 24, wherein the one or more processors are configured to store LLR values corresponding to at least the portion of the mini-slot for decoding the eMBB slot when the indication message was not received in the mini-slot.

* * * * *